Jan. 1, 1946.  B. V. MAGEE  2,391,912
ELECTRICAL RECORDING
Filed Feb. 8, 1941  2 Sheets-Sheet 1

INVENTOR
B. V. MAGEE
BY
M. J. Reynolds
ATTORNEY

Jan. 1, 1946. B. V. MAGEE 2,391,912
ELECTRICAL RECORDING
Filed Feb. 8, 1941 2 Sheets-Sheet 2
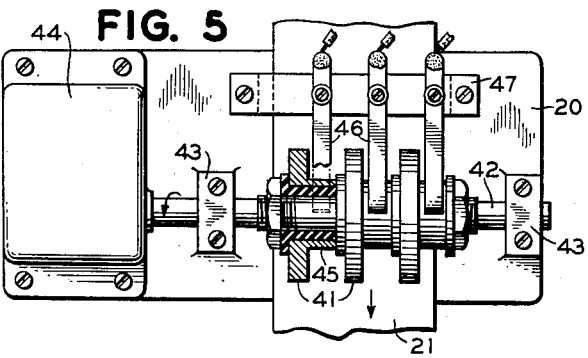
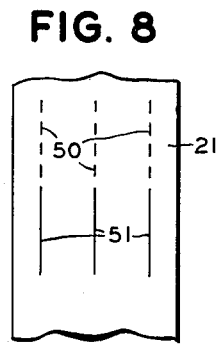
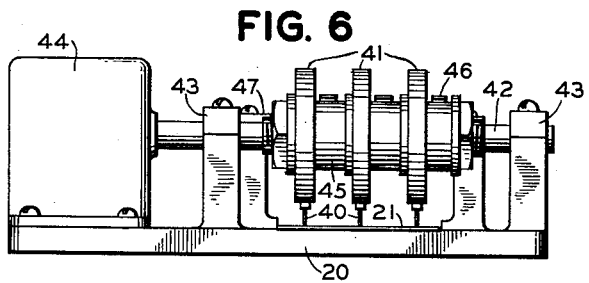
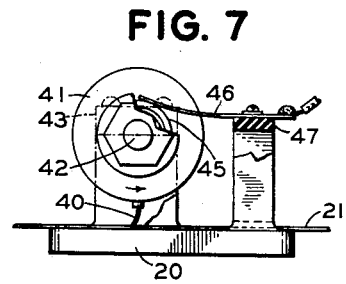
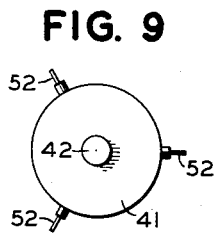
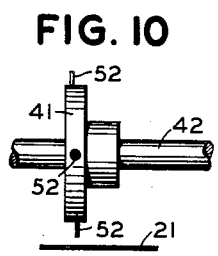
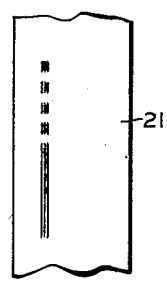
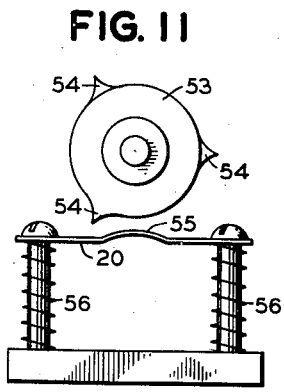
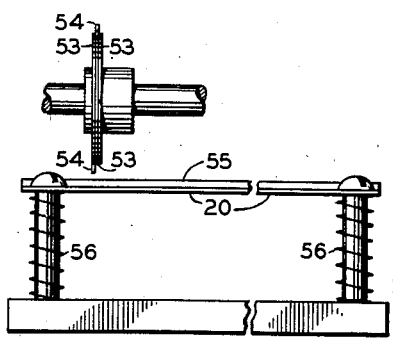
INVENTOR
B. V. MAGEE
BY M. J. Reynolds
ATTORNEY Patented Jan. 1, 1946

2,391,912

UNITED STATES PATENT OFFICE 2,391,912

ELECTRICAL RECORDING

Bruce V. Magee, Fair Haven, N. J., assignor to The Western Union Telegraph Company, New York, N. Y., a corporation of New York Application February 8, 1941, Serial No. 377,987

1 Claim. (Cl. 234—27.5)

This invention relates to mechanisms for recording electric signals and more particularly to recorders employed in certain types of recording meters and indicators.

In one such system a sheet of recording paper is fed at a very slow speed across a supporting platen beneath a recording stylus which is connected to an associated signal circuit for the purpose of recording on the paper the signal impulses received over the circuit. The paper is preferably a conducting paper having a coating of lead thiosulphate such, for example, as the paper disclosed in the patent of B. L. Kline, Patent No. 2,251,742, granted August 5, 1941. Each signal impulse passes from the stylus through the recording paper, which is marked thereby, to the platen which provides the return for the signal circuit. Inasmuch as the period of each signal impulse may be appreciable, for example, of the order of magnitude of two seconds, and the paper is fed at a relatively slow rate, it has been found that efforts to adapt recording paper to this type of recording result in burning of the paper by the prolonged current flow when the signal impulse is received.

An object of this invention is to provide a recording mechanism of the type set forth constructed and arranged to operate upon slow moving recording paper satisfactorily and without burning.

A further object is to provide a recording mechanism of the type set forth arranged to operate a battery of styli each connected to a separate signal circuit.

A still further object is to provide a recording mechanism capable of producing an easily discernible mark on the recording paper.

These and other objects which will be apparent to those skilled in the art are accomplished by the present invention, which is illustrated in the accompanying drawings, in which:

Fig. 5 is a top plan view of a modified form of recording mechanism;

Fig. 6 is a front elevation thereof with the recording paper and supporting platen in section;

Fig. 7 is an end elevation thereof;

Fig. 8 is a plan view of a piece of recording paper showing the operation of the mechanism illustrated in Figs. 5 to 7;

Figs. 9 to 12 illustrate modified forms of styli for use with the mechanism of Fig. 5; and Fig. 13 shows a portion of a recording paper as marked by the devices illustrated in Figs. 9 to 12.

In the illustrated embodiments of the invention the recording paper is fed over the supporting platen at a very slow rate beneath one or more recording styli. In order to prevent damage to the paper as a result of current passing through the paper for too long a time at a given point during recording of a signal impulse, the present invention provides a recording mechanism in which relative movement is produced between the paper and stylus in addition to that resulting from the feed of the paper.

Figure 1:
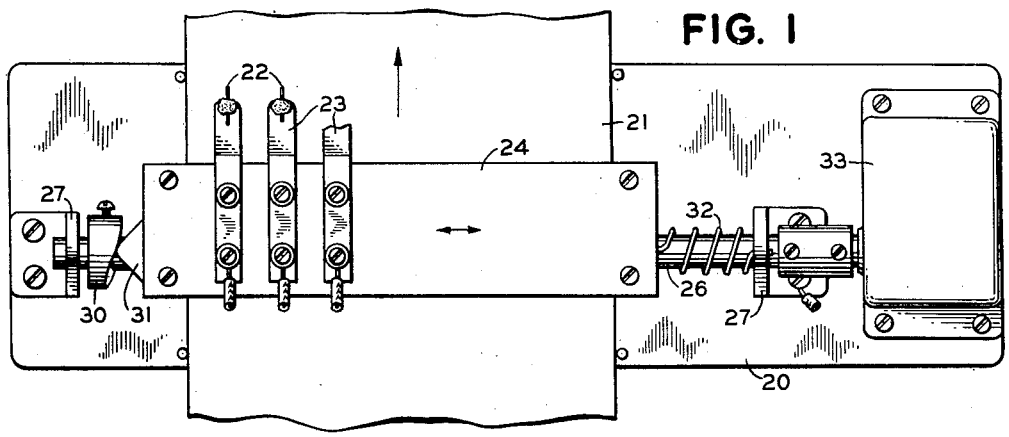
Fig. 1 is a plan view of a recording mechanism constructed in accordance with one embodiment of this invention.
Figure 3:
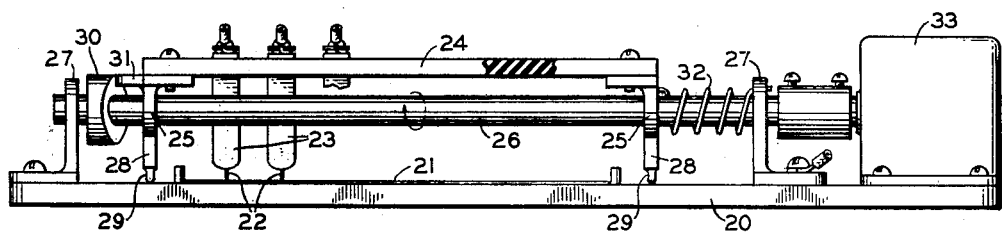
Fig. 3 is a front elevation showing the recording paper and supporting platen in section.
Figure 2:
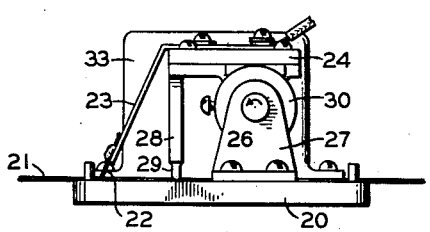
Fig. 2 is an end elevation of the mechanism shown in Fig. 1.

As illustrated in Figs. 1 to 3, a flat platen 20 is provided to support a strip or sheet 21 of recording paper which is fed across the platen beneath one or more styli 22 secured in clamps 23 mounted on a stylus supporting panel 24 which is, in turn, supported on spaced collars 25 surrounding a cam shaft 26 rotatably mounted on bearings 27. Each collar has an extension 28 provided with a foot 29 adapted to engage the platen or other support when the panel 24 is parallel to the platen. Rotation of the cam shaft is counter-clockwise, as viewed in Fig. 2.

A cam 30 secured to the cam shaft engages a cam follower 31 on the adjacent collar 25 while a torsional and compressive spring 32, fastened at one end to the opposite collar and at its other end to the adjacent bearing 27, presses the collars and panel so as to hold the follower against the cam face, and at the same time applies a rotative force to the stylus panel 24 and supporting collars 25 to press the feet 29 upon the platen 20.

The cam shaft is rotated at a speed of approximately one revolution for each period of signal impulse. If, for example, the period of each signal impulse is two seconds the cam shaft is rotated at a speed of one revolution every two seconds. A motor 33 may be used for this purpose.

A single stylus can be employed, or if the mechanism is to be used for recording signals from a plurality of different points of origin as, for example, different tracks in the case of railway signaling, a battery of styli can be mounted on the panel 24 and each stylus connected by a separate circuit to a separate signal transmitting device. The separate styli are insulated from each other preferably by making the panel of insulating material. The signal circuits are completed from the styli points through the recording paper to the platen which is a common return for the different signal circuits.

Figure 4:
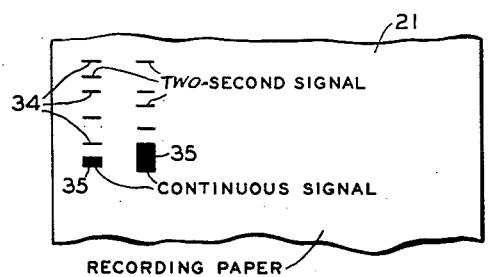
Fig. 4 is a plan view of a piece of recording paper showing the operation of the mechanism illustrated in Figs. 1 to 3.

With the cam shaft rotating counterclockwise, as seen in Fig. 2, and at a speed equal to one revolution per period of signal impulse, it will be apparent that each stylus is caused by the cam 30 to make a complete reciprocation during each signal impulse resulting in relative motion between the paper and stylus in addition to that resulting from the very slow feed of the paper, in this case transverse to the direction of feed. As a result, the effect of the passage of current through the paper is dissipated over an elongated path rather than confined substantially to one point. No one point is subjected to the effect of the signal impulse a sufficient length of time to burn through while at the same time an enlarged, readily discernible mark 34 is produced on the paper. Even if a continuous signal is received for a prolonged period of time, the effect will be spread over a substantial area of the recording paper to form a solid rectangular mark, as indicated at 35 in Fig. 4.

In the embodiment illustrated in Figs. 5 to 8, the same platen 20, over which the sheet 21 of recording paper feeds, is employed. One or more resilient styli 40 are supported on mountings 41 secured to a shaft 42 rotatably mounted above the platen 20 in bearings 43 and extending transversely to the direction of feed of the recording paper. The stylus shaft is rotated at a speed equal to one revolution per period of signal impulse, by a motor 44 or the like.

The stylus mountings are conducting and, as illustrated in Figs. 5 and 6, each holds one stylus. The mountings are insulated from the supporting shaft and from each other. Each mounting has a contact groove 45, the surface of which is engaged by a contact brush 46 mounted on an insulating brush panel 47 and connected to a given signal circuit.

With the stylus shaft 42 rotating in such a direction that the stylus points pass over the recording paper in a direction opposite to its direction of feed and at the above stated speed, it will be apparent that each stylus is caused to move during each signal impulse a given amount resulting in relative motion between the paper and stylus in addition to that resulting from the paper feed, in this case in a direction opposite to the direction of feed. As a result, the effect of the passage of current through the paper is dissipated and an elongated readily discernible mark 50 is produced. In case a continuous signal is received for a prolonged period of time a continuous elongated mark 51 is formed, since the movement of the paper 21 during the time the stylus loses contact therewith is less than the length of the trace of the stylus during each revolution of the shaft 42.

If desired, the width of the recorded mark produced by the rotary stylus can be increased by mounting two or more stylus points 52 on each mounting, as shown in Figs. 9 and 10. In such case, the styli are equidistantly spaced on the periphery of the mounting and offset circumferentially so that each stylus engages the paper on a line adjacent to but slightly spaced from the preceding stylus to produce relatively wide marks on the paper, as shown in Fig. 13.

In the embodiment shown in Figs. 11 and 12, the three stylus points are formed by clamping three discs 53 together, each having a point 54 formed therein.

A smaller contact area can be obtained with the rotating stylus, if desired, by forming the platen 20 with a contact hump 55, see Fig. 11, and the platen can be supported on springs 56 to provide a resilient support.

The mechanism of the present invention is adapted for use with well-known railway signal circuits now in operation, the details of which need not be here described. It will be understood that many modifications and changes can be made in the structure shown without departing from the essential attributes of the invention, and I contemplate all such changes as coming within the scope of the appended claim.

What is claimed is:

An electrical recorder for recording electrical signal impulses each of prolonged current flow, comprising electrical stylus structure which traverses an electro-sensitive recording blank for applying said signaling current impulses thereto, means for causing relative movement in one direction between said stylus and the recording blank during the reception of signal impulses applied by the stylus structure to the blank, said relative movement being at a comparatively slow rate such that prolonged current flow due to the signal impulses tends to burn the recording blank, and means for preventing burning of the recording blank by said prolonged current flow, said last-named means comprising electrically actuated mechanism invariably operative during the reception of each of said signal impulses for oscillating the stylus through a predetermined limited path laterally of the path of said relative movement during substantially the entire period of current flow of each impulse, the rate of the oscillatory movement being such that the resultant relative movement between the stylus structure and the surface of the blank is sufficiently fast to prevent burning of the blank.

BRUCE V. MAGEE.